June 22, 1965 H. MULLER 3,190,449
FILTER APPARATUS
Original Filed June 11, 1956 3 Sheets-Sheet 1

INVENTOR
Hans Muller
BY
Michael S Striker
Attorney

June 22, 1965          H. MULLER          3,190,449

FILTER APPARATUS

Original Filed June 11, 1956          3 Sheets-Sheet 2

INVENTOR
Hans Muller
BY Michael S. Striker
Attorney

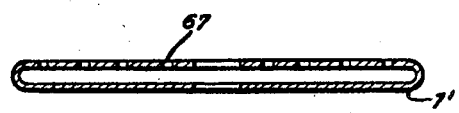
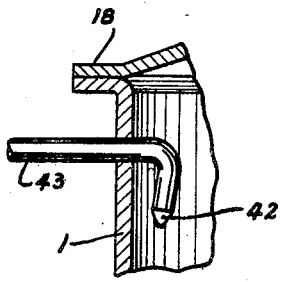
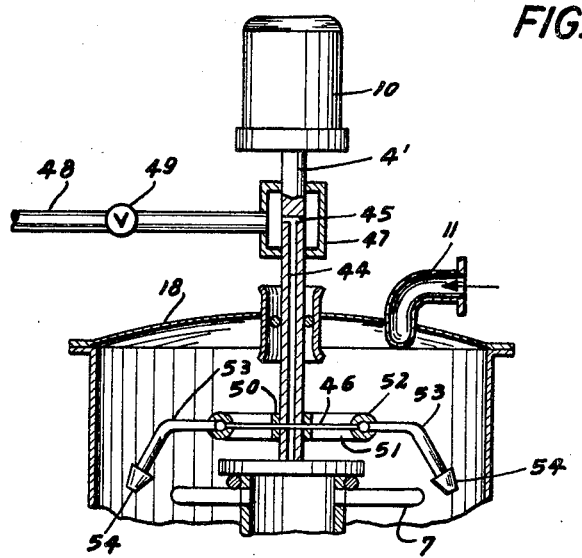
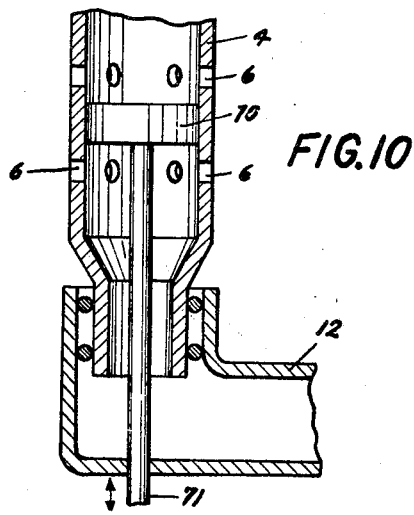

United States Patent Office 3,190,449
Patented June 22, 1965

3,190,449
FILTER APPARATUS
Hans Muller, Im Allemendli, Erlenbach,
Zurich, Switzerland
Original application June 11, 1956, Ser. No. 590,656.
Divided and this application May 20, 1959, Ser. No. 814,427
3 Claims. (Cl. 210—173)

The present invention relates to a filter apparatus.

This is a divisional application of my copending application 590,656 filed June 11, 1956, now abandoned.

With known filtering apparatuses, it is possible to carry out only certain types of filtering operations. Certain constructions are only suitable for certain types of filtering and cannot be used for others. Furthermore, a considerable amount of manual operations are required with conventional filtering processes and apparatuses.

One of the objects of the present invention is to overcome the above drawbacks by providing a filter apparatus which is capable of being used for all types of filtering.

Another object of the present invention is to provide a filter apparatus wherein the successive filtering cycles may be carried out in a substantially automatic fashion so that a minimum amount of work on the part of the operator is required.

A further object of the present invention is to provide a filter apparatus capable of removing in a very efficient fashion the particles which are retained by the filters.

A further object of the present invention is to provide a filter apparatus in which the filtered material is prevented from clinging together and forming undesirable masses.

Still another object of the present invention is to provide a filter apparatus wherein it is possible to eliminate temporarily the action of certain filter elements.

A still further object of the present invention is to provide a filter apparatus where the material which is filtered from a liquid, for example, may be dried and may, if desired, be washed before it is dried.

It is also an object of the present invention to provide a filter apparatus wherein the filtering action stops at the right moment automatically and the removal of the filtered material then takes place also in a fully automatic manner.

Also, with the above objects in view, the present invention mainly consists of a filter apparatus which includes an elongated filter housing of substantially cylindrical configuration having a lower portion of reduced cross section. An elongated hollow shaft is substantially coaxial with the housing, extends along the interior thereof and is turnably supported by the housing, and a plurality of filter elements are carried by the shaft for rotation therewith and communicate with the interior of the shaft. A drive means is connected to the shaft for rotating the latter, so that after a liquid having solid particles therein passes through the filter elements on the hollow shaft the particles retained by the filter elements may be thrown from the latter by centrifugal force during rotation of the shaft.

The novel features which are considered as characteristic for the invention are set forth in particular in the appended claims. The invention itself, however, together with additional objects and advantages thereof, will be best understood from the following description of specific embodiments when read in connection with the accompanying drawings, in which:

Figure 3:
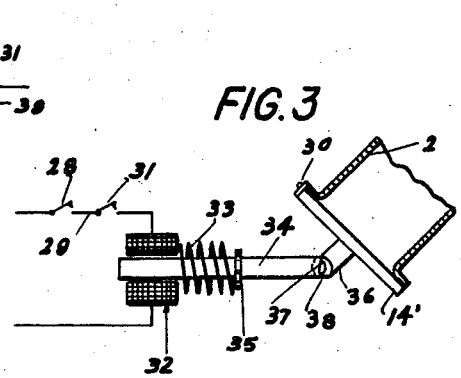
Figure 4:
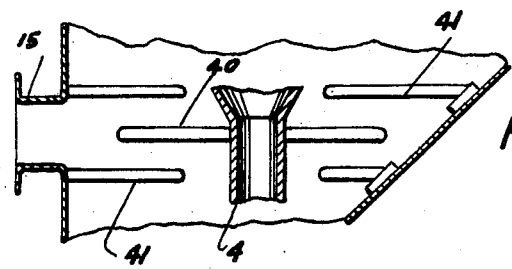
Figure 5:
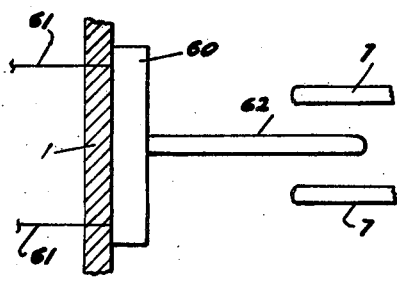
Figure 6:
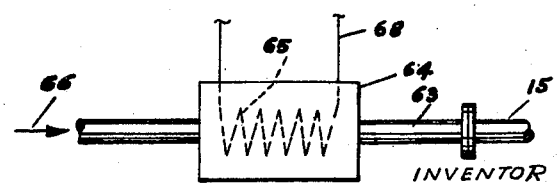

FIG. 3 diagrammatically illustrates a structure for automatically opening and closing the discharge opening of the filter apparatus;

FIG. 4 diagrammatically shows structure for preventing the filtered particles from clinging together;

FIG. 5 diagrammatically shows structure for heating the interior of the filter apparatus;

FIG. 6 diagrammatically shows structure for directing a stream of hot gas to the interior of the housing;

FIG. 7 is a sectional elevational view of a filter element of a special construction;

FIG. 8 diagrammatically shows a nozzle arrangement for cleaning out the interior of the filter apparatus;

FIG. 9 diagrammatically illustrates a nozzle arrangement where the nozzles turn with the filters; and FIG. 10 diagrammatically illustrates an arrangement which permits certain of the filter elements to be set out of operation.

Figure 1:
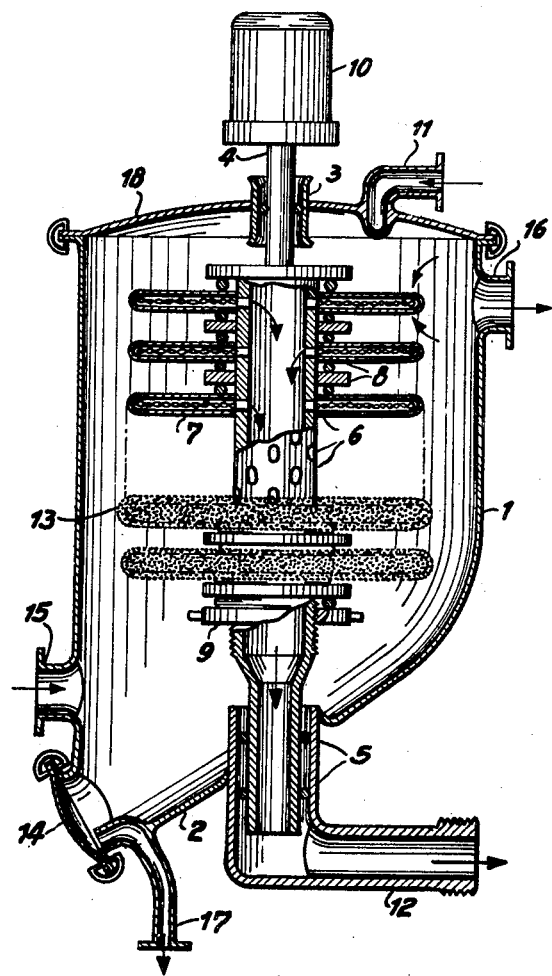
FIG. 1 is a partly schematic, sectional, elevational view of a filter apparatus according to the present invention.

Referring now to FIG. 1 of the drawings, it will be seen that the filter apparatus illustrated therein includes a housing 1 which is of substantially cylindrical configuration. The lower portion of this housing is of reduced size and extends to one side of the axis of the housing to form a discharge passage 2 at the bottom of the housing. A cover 18 closes the top of the housing, and this cover 18 carries a bearing 3 for a drive shaft 4. This drive shaft 4 has an elongated hollow portion which is turnably guided adjacent its bottom end by another bearing 5 located at the lower wall of the housing. The bearings 3 and 5 may take the form of suitable sealing glands, rubber rings, or the like so that the interior of the housing is sealed from the exterior thereof. The hollow portion of the shaft 4 is formed in its wall with suitable cutouts 6. A series of filter elements 7 are carried by the shaft 4 for rotation therewith and cooperate through the cutouts 6 with the interior of the shaft 4. In the illustrated example the filter elements 7 are of a substantially flat disk-shape, but they may have any other suitable form. These filter elements are in the form of hollow disks having walls formed with suitable apertures through which a liquid flows while the particles suspended in the liquid are retained at the exterior of the filter elements. A plurality of sealing rings 8 are located between each pair of successive filter elements 7 so that the hollow shaft 4 can communicate at its interior only with the interior of the filter elements 7. The sealing rings 8 take the form of an annular washer or the like located between a pair of rubber rings which respectively engage a pair of successive filter elements, as shown in FIG. 1. Thus, the sealing rings 8 not only seal the hollow shaft 4, but in addition they serve to space the filter elements at the desired distances from each other. The bottom end portion of the shaft 4 is threaded at its exterior, and a nut 9 is carried by this threaded portion of the shaft 4 and serves to press all of the filter elements 7 and sealing rings 8 together, the shaft 4 being provided at its upper portion, just beneath the bearing 3, with an outwardly extending annular flange against which the topmost sealing ring bears. A motor 10 or other suitable drive means is operatively connected to the upper end of the drive shaft 4 for rotating the latter in a manner described below.

The liquid which is to be filtered flows into the apparatus through a pipe 11 connected to and passing through the cover 18 and having a bottom open end, this pipe 11 communicating with any suitable conduit which leads from any desired source of the liquid to be filtered. The liquid to be filtered fills the housing 1 and surrounds the filter elements 7. The liquid passes through the filter elements into the interior thereof during the filtering process, and then the liquid flows through the cutouts 6 into the hollow shaft 4 whose bottom open end extends into a discharge tube 12. A suitable pump or the like (not shown) communicates with the interior of the tube 12 to draw the filtered liquid therethrough.

The filter elements 7 may remain stationary during the filtering process, or the shaft 4 may be rotating slowly during the filtering process, and the filtered particles collect at the outer surface of the filter elements 7 to form the cakes 13. When the cakes 13 have attained a predetermined thickness, so that very little or no liquid can flow through the cakes 13 into the filters, then the flow of liquid to be filtered to the pipe 11 is stopped in any suitable way, which may be manual or automatic, and the shaft 4 is rotated at a high speed so that the particles which form the cakes 13 are thrown from the filter elements 7 by centrifugal force. The setting of the shaft 4 into a high speed of rotation may be carried out either by hand or automatically. Where the shaft 4 is set into high speed rotation automatically, the automatic action may be derived from the liquid which flows only slowly through the pipe 12.

Figure 2:
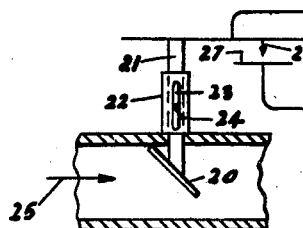
FIG. 2 is a partly schematic, fragmentary sectional elevational view of one possible structure for automatically setting into operation the drive for centrifugally throwing the filtered particles from the filters.

FIG. 2 shows one possible structure for producing this result. As may be seen from FIG. 2, the pipe 12 has a plate 20 located in its interior, and the plate 20 is connected to the bottom end of a rod 21 which extends slidably and in a fluid-tight manner through a tube 22 fixed to the pipe 12 and communicating with an opening formed in the tube 22 through which the rod 21 passes. The tube 22 is formed with an elongated, longitudinal slot 23 through which extends a pin 24 fixed to the rod 21, so that the latter and the plate 20 cannot turn about the axis of the rod 21. The liquid which is filtered flows through the pipe 12 in the direction of the arrow 25. The inclination of the plate 20 and the weight of the latter together with the rod 21 are such that when the liquid flows in the direction of arrow 25 during normal filtering the force of the liquid exerts an upward component on the rod 21 to keep the latter elevated substantially in the position shown in FIG. 2. However, as the thickness of the cakes 13 increases and the rate of flow of the liquid through the pipe 12 decreases the rod 21 together with the plate 20 gradually move downwardly as a result of their own weight. As may be seen from FIG. 2 the rod 21 carries a switch contact member 26 insulated therefrom and movable therewith, and the contact member 26 is located opposite a stationary contact member 27 located in a circuit which includes the motor 10. When the rod 21 and plate 20 have moved downwardly through a distance sufficient to cause the contact 26 to engage the contact 27, a circuit is completed which sets the motor 10 into a high speed of rotation so that the filter elements 7 are automatically turned at high speed to centrifugally throw the cakes 13 from the filter elements 7.

As may be seen from FIG. 2, the rod 21 also carries a switch contact element 28 which moves toward a stationary switch contact element 29 as the rod 22 together with the plate 20 move downwardly. When the switch 26, 27 is closed, the switch 28, 29 also is closed. As is shown diagrammatically in FIG. 3, this switch 28, 29 is located in a circuit which includes a solenoid 32. The armature 34 of this solenoid has a flange 35 fixed thereto, and a coil spring 33 is coiled about the armature 34 and engages the flange 35 and the windings of the solenoid 32 to urge the armature 34 to the right, as viewed in FIG. 3. The right end of the armature 34 is formed with a slot 38 through which extends a pin 37 fixed to a lug 36 which is fixed to the closure member 14' which is hinged at 30 to the discharge opening of the part 2 of the housing 1. The circuit of the solenoid 32 also includes a switch 31 which is urged to its closed position by a spring 39, as shown diagrammatically in FIG. 2. Thus, when the filter elements 7 rotate at high speed automatically in the manner described above, the solenoid 32 is energized to move the armature 34 to the left, as viewed in FIG. 3, and in this way the closure member 14' is opened so that the cakes 13 thrown from the filter elements 7 may move by gravity out of the housing 1. When a sufficient amount of the material collected by the filter elements 7 is removed in this way, the switch 31 may be opened either manually or automatically through the use of a solenoid, for example, which is energized by a suitable timing mechanism, for example. When the switch 31 is opened, the solenoid 32 becomes unenergized, and the spring 33 automatically closes the discharge opening of the filter housing 1. Then the flow of the liquid to be filtered through the pipe 11 is again started either automatically or manually, and the above operations are repeated.

The particles thrown from the filter elements in the above described manner simply fall by gravity out of the discharge opening of the filter. The movement of the particles from the interior of the filter housing 1 can be aided by the use of a screw conveyor, for example, or fluids under pressure such as liquids or gases may also be used for the same purpose. Such fluids under pressure may also serve the purpose of washing the particles which are filtered from the liquid and which are washed out of the housing together with the liquid or gas under pressure which is introduced for this purpose. If desired, the shaft 4 may have fixed thereto scraper elements which scrape the inner surface of the housing 1 so as to clean the latter of particles which tend to cling thereto.

It sometimes happens that these particles are of such a nature that they cling together and form masses which are very undesirable where it is desired to have a loose quantity of filtered particles, and furthermore such masses of particles can plug up the discharge opening 14 in an undesirable manner. To prevent this the arrangement shown in FIG. 4 may be used. Thus, the hollow shaft 4 has fixed thereto a plurality of rods 40 which extend radially from the shaft 4 and which are distributed about its axis, and the housing 1 has fixed to its interior surface a plurality of cooperating rods 41 which also extend radially with respect to the axis of the housing 1 and which are fixed at their outer ends to the inner surface of the housing 1. As is apparent from FIG. 4, the rods 40 will rotate with the shaft 4 with respect to the rods 41, and the material moving downwardly through the rods 40 and 41 will necessarily be broken up by these rods so that with this arrangement it is impossible for the particles of material to cling together and form masses which are likely to stop up the discharge opening 14.

The liquid or gas introduced under pressure in order to aid in the removal of particles from the interior of the filter housing 1 may be introduced through nozzles. Thus, FIG. 8 shows how a nozzle 42 may be arranged within the housing 1 beneath the cover 18 thereof. The nozzle 42 is located at the end of a conduit 43 leading from any suitable source of fluid under pressure and passing in a fluid-tight manner through the wall of the housing 1. A plurality of the conduits 43 and nozzles 42 are distributed about the axis of the housing, and the conduits 43 communicate with a suitable header to which the fluid under pressure is supplied, and a suitable valve may be provided for supplying the fluid under pressure to the nozzles 42. These nozzles 42 are directed downwardly in the manner shown in FIG. 8 and are located between the filter elements 7 and the inner wall of the housing 1. The fluid may be supplied to the nozzles 42 either after the particles are centrifugally thrown from the filter elements or before the particles are centrifugally thrown from the filter elements through suitable operation of the valve which supplies the fluid to the conduits 43. Where the fluid from the nozzles 42 is supplied before the filter elements are rotated at high speed, the particles centrifugally thrown from the filter elements never have the opportunity of being thrown onto the outer wall of the housing 1.

Instead of stationary nozzles as shown in FIG. 8, rotating nozzles may be provided, as shown in FIG. 9. Thus, referring to FIG. 9, it will be seen that the shaft 4' is formed in its interior with an elongated bore 44 communicating at its top end with a transverse bore 45 and adjacent the lower end of the bore 44, which communicates with the hollow interior of shaft 4', this shaft is formed with a second transverse bore 46. An annular inwardly directed channel member 47 is supported in any suitable way at the elevation shown in FIG. 9, in a position surrounding the shaft 4' at the transverse bore 45 thereof, and the shaft 4' extends in a fluid-tight manner through the stationary channel 47, so that in this way the interior of the latter communicates with the transverse bore 45. A tube 48 leads from any suitable source of fluid under pressure to the channel 47, and a valve 49 is located in the tube 48 to control the flow of fluid to the channel 47. The fluid flow from the interior of channel member 47 downwardly along the axial bore 44 of shaft 4'. The shaft 4' has a ring 50 fixed thereto, and this ring 50 carries a plurality of tubes 51 extending radially with respect to the axis of the shaft 4'. In the illustrated example, there are two tubes 51 communicating with the transverse bore 46 and communicating at their outer ends with a hollow ring 52 which is carried by the tubes 51. The ring 52 also carries a plurality of tubes 53 which extend radially with respect to the axis of the shaft 4' and are distributed about its axis, and the tubes 53 carry at their outer ends a plurality of nozzles 54. Thus, the fluid under pressure will flow along the axial bore 44 of shaft 4' through the transverse bore 46 thereof, and through the tubes 51 into the hollow ring 52 and along the tubes 53 to the nozzles 54. These nozzles rotate with the shaft 4' so that the jets of fluid issuing from the nozzles rotate about the axis of shaft 4' with the filters carried by the shaft 4. Through suitable control of the valve 49, the fluid under pressure may be introduced into the housing 1 either before the particles are thrown from the filter element 7 or after or during the time necessary from the filter element 7.

Under certain circumstances it is desirable to remove dry particles from the interior of the filter housing 1, and before such dry particles are removed they may be washed. This washing can be carried out simply by introducing clear, clean liquid into the filter housing 1 through the pipe 11 after the filtering action has terminated, so that this clean liquid washes the particles, and then the liquid is drawn off through the pipe 12 in the same way as the liquid which was filtered. The drying which takes place subsequent to the washing may be carried out in many different ways, and one of these ways is to heat the interior of the housing 1 as well as the filter elements 7. As is shown diagrammatically in FIG. 5, the housing 1 may carry at its inner face suitably insulated heating elements 60 connected through the lead 61 to any suitable source of electrical current so that when the heating element 60 is energized it will heat the interior of the housing 1 so as to dry particles therein. Furthermore, the heating elements 60 may include a portion 62 extending between successive filter elements 7, so that when the heating element 62 is energized the filter elements themselves will have heat applied thereto and the material carried by the filter elements 7 will be dried. The vapors resulting from the heating action may be drawn off through the pipe 12.

If desired the drying may be carried out by introducing heated gases into the interior of the housing 1. Such a heated gas may enter the housing 1 through the inlet 15 and may leave through the discharge 16, shown in FIG. 1. Where such heating of the interior of the housing 1 is not required, the elements 15 and 16 may be omitted. As is shown diagrammatically in FIG. 6, a tube 63 is connected to and communicates with the inlet 15, and the tube 63 carries an enclosed chamber 64 in which a heating element 65 is located, this heating element being electrically energized in any suitable way. Air from a suitable blower is directed in the direction of arrow 66 of FIG. 6 through the conduit 63 and through the chamber 64 so as to be heated in the latter, and the heated air, for example, enters through the inlet 15 to the interior of the housing 1 to dry particles therein, and then the hot gas which has given up its heat to the interior of the housing 1 to dry particles in the latter moves out through the discharge 16. The heating of the interior of the housing may also take place by radiation, by induction, or by provision of a suitable vacuum.

Thus, with the filter apparatus and process of the invention it is possible to continually filter materials in suspension, such as coloring materials, pharmaceutical materials, salts, and the like, and they may be processed until they are dry without ever being contacted by the hands of an operator. The dry particles of the above type may be removed from the filter with the aid of air or other gas under pressure introduced into the filter apparatus through the above described nozzle arangements shown in FIGS. 8 and 9. A vacuum is provided in the pipe 12 to draw off through the latter the vapors produced by heating the interior of the housing 1 during drying of particles therein.

Instead of being completely foraminous, the filter elements may have the form shown in FIG. 7, where the filter element 7' is provided with openings 67 only in its top wall. With such filter elements the particles which are retained by the filter will be deposited only on the top sides thereof, and thus the particles are retained far more reliably by the filters. Thus, vibrations cannot easily shake the particles from the filter elements. Where the filtering is of such a nature that it is intended to provide a clear filtering of liquids, then before the actual filtering takes place a suitable substance such as kieselguhr, asbestos fibers, or similar materials are suspended in a liquid and deposited upon the filter elements by filtering of this liquid, so that such a substance then forms a very fine filter in addition to the filter elements 7. At the end of the filtering process, these filtering materials are separated from the filter elements 7, and at the next filtering process fresh filtering material is deposited on the filter elements 7. The rotation of the filter elements 7 permits the material thereon to be thrown from the filter elements. It is unnecessary to open the filter housing 1 in order to remove such material.

Certain filtering processes are carried out in order to obtain the filtered liquid rather than the particles retained from the liquid. For example, the sugar and beverage industries as well as the pharmaceutical industry in the manufacture of penicillin, for example, carry out processes of this type. With such processes a suitable cleaning liquid is moved in the reverse direction through the pipe 12 upwardly into the hollow shaft 4 and through the filter elements in order to aid in the cleaning of the latter. When such a backwashing of the filters is carried out together with the rotating of the filters to centrifugally throw particles therefrom, a very effective cleaning is obtained by this combination of cleaning features.

A filtering process may be carried out by first introducing into the housing 1 a water which has suspended therein a suitable material for aiding in the filtering, such as kieselguhr, wood powder, asbestos fibers, or the like. Such water is drawn off through the pipe 12 until the filter elements have a thickness of the filtering material of between 5 and 10 mm. Then the juice or the like which is to be filtered is introduced into the housing 1 and is filtered through the filter elements 7 and the material previously deposited thereon until it is no longer possible to filter the juice or until only a small amount of juice can be filtered. When the filtering process has reached this stage, then the material deposited on the filter elements are thrown centrifugally therefrom and water is washed back through the pipe 12 and hollow shafts 4 and through the filter elements so as to clean the latter. It is also desirable under certain circumstances to pass hot water through the filter apparatus after the filters have been provided with a layer of suitable filtering material, so that in this way the filtering structure is sterilized and the juice which is filtered passes only through sterile filtering structure. After one filtering cycle of operation has been completed, the next may be started without opening the housing 1, except for the discharge opening 14 thereof through which the particles pass to the exterior of the housing. The filtering process can take place in a fully automatic manner if desired so that the filtering, drying, throwing of particles from the filtering elements, cleaning of the latter, and the like all take place without any manual operations by an attendant, for example.

Under certain circumstances it is desirable to prevent filtering through part of the filter elements, such as the lowermost filter elements 7, for example. FIG. 10 shows a structure capable of accomplishing this result. Thus, referring to FIG. 10, it will be seen that an element 70 similar to a piston is slidably located within the interior of the hollow shaft 4. This piston 70 acts similar to a valve. It has an axial length greater than the axial length of the series of openings 6 which are respectively located at the elevations of the filter elements 7. Thus, if the piston 70 is moved downwardly, as viewed in FIG. 10, until it covers the lowermost openings 6, then the lowermost filter element 7 which communicates with these lowermost openings 6 will be prevented from communicating with the interior of the hollow shaft 4, and in this way the lowermost filtering element may be placed out of communication with the hollow shaft 4 and will not participate in the filtering process. The piston 70 has a rod 71 fixed thereto which extends along the axis of the hollow shaft 4 and which extends in a fluid-tight manner through an opening in the pipe 12 to the exterior of the filter apparatus where any suitable handle or the like may be provided to enable the operator to shift the rod 70 axially so as to locate the piston 70 either in the position shown in FIG. 10 where it does not block the filtering action of any of the filtering elements or in an operating position where its cuts off communication between a desired filter element and the interior of the hollow shaft 4. The rod 71 may cooperate with any suitable indicia for indicating at the exterior of the apparatus the particular filter element which is cut off from communication with the interior of the hollow shaft 4, and furthermore any suitable means may be provided for releasably holding the rod 71 at a desired elevation.

If the structure of FIG. 10, the lowermost filter element 7 is cut off from communication with the interior of the hollow shaft 4, for example, then it is possible to introduce air under pressure into the housing 1 before the end of the filtering process, and this air under pressure will lower the level of the liquid within the housing 1 down to the lowermost filter element which is thus cut off from communication with the interior of the hollow shaft 4. In this way all but a small part of the liquid within the housing 1 may be emptied therefrom through the filter elements, and this unfiltered small amount of liquid which remains within the housing 1 can then be supplied back to the pipe 11 to be reintroduced into the housing 1 so as to be filtered, suitable pump, tank, and conduits being provided for recirculating the unfiltered portion of liquid. Thus, the remaining volume of the filter apparatus, except for the portion below the lowermost filter element, may be completely filtered in this manner.

It is also possible to cause the shaft 4 to rotate back and forth in opposite directions very quickly so that a turning vibration of the shaft 4 and the filter elements connected thereto is provided. With such an arrangement, the apparatus is particularly suited for filters in which the filter elements are in the form of fabric members. When such fabric filter elements are used, they can be very thoroughly cleaned during oscillation of the shaft 4 because then the filter apparatus acts as a washing machine by the periodic change in the direction of rotation of the shaft 4 because in this way the fabric filter elements are agitated so as to become unstopped and to give up particles to the interior of the housing 1. When used in this way as a washing machine, cleaning liquid may be introduced into the filter in the reverse direction through the pipe 12 so as to very effectively clean clogged filters. With such an arrangement is is possible to very quickly and thoroughly provide an extensive cleaning of clogged filters, as compared to an arrangement where the filter elements always turn in one direction.

As may be seen from FIG. 1, a tube 17 communicates with the lowermost portion of the housing 1, so that it is possible to empty the latter completely through the tube 17. When the liquid is drawn from the housing 1 through the pipe 17, it is circulated again through the housing 1, so that it is possible to filter all of a given amount of liquid with the process and apparatus of the invention, and air under pressure may be introduced into the container 1 to assist in the filtering of a complete body of liquid.

It will be understood that each of the elements described above, or two or more together, may also find a useful application in other types of filtering process and apparatus differing from the types described above.

While the invention has been illustrated and described as embodied in continuous filtering process and apparatus, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a filter apparatus, in combination, a housing having a substantially cylindrical configuration over most of its length and having a lower portion of a reduced cross sectional area as compared to the remainder of said housing; a discharge opening located at said lower portion of said housing, an elongated hollow shaft substantially coaxial with said housing supported for rotation about its axis by said housing; a plurality of filter elements communicating with the interior of said hollow shaft and carried thereby for rotation therewith; drive means operatively connected to said shaft for rotating the latter at high speed so as to throw off by centrifugal action solid particles settling on said filter elements; and heating means located in said housing and extending between said filter elements for heating the interior of said housing and for drying particles settling on said filter elements to facilitate thereby removing of the dried particles from said filter elements by centrifugal action, whereby dried particles may be removed through said discharge opening without removing said filter elements from said housing.

2. In a filter apparatus, in combination, a housing having a substantially cylindrical configuration over most of its length and having a lower portion of a reduced cross sectional area as compared to the remainder of said housing; a discharge opening located at said lower portion of said housing; an elongated hollow shaft substantially coaxial with said housing supported for rotation about its axis by said housing; a plurality of filter elements communicating with the interior of said hollow shaft and carried thereby for rotation therewith; drive means operatively connected to said shaft for rotating the latter at high speed so as to throw off by centrifugal action solid particles settling on said filter elements; and means communicating with the interior of said housing for directing a hot gas therethrough so as to heat the interior of said housing and so as to dry particles settling on said filter elements to facilitate thereby removal of the dried particles from said filter elements by centrifugal action, whereby dried particles may be removed through said discharge opening without removing said filter elements from said housing.

3. In a filter apparatus, in combination, a housing having a substantially cylindrical configuration over most of its length and having a lower portion of a reduced cross sectional area as compared to the remainder of said housing; a discharge opening located at said lower portion of said housing; an elongated hollow shaft substantially coaxial with said housing and supported for rotation about its axis by said housing; a plurality of filter elements communicating with the interior of said hollow shaft and carried thereby for rotation therewith; inlet means communicating with the interior of said housing for feeding material to be filtered thereinto; outlet means communicating with the interior of said hollow shaft for discharging filtrate therefrom; drive means operatively connected to said shaft for rotating the same at high speed for removing by centrifugal action filter cakes settling on said filter elements; a first plurality of rods fixed to said shaft for rotation therewith and projecting radially therefrom into said lower portion of said housing; and second plurality of rods fixed to the lower portion of said housing and projecting therefrom, slightly spaced in direction of the shaft axis from said first plurality of rods, towards said shaft, said first and said second plurality of rods co-operating together during rotation of said shaft and said first plurality of rods connected thereto to break up filter cakes thrown from the filter elements during rotation of the shaft so as to facilitate discharge of the material of the filter cakes through said discharge opening.

References Cited by the Examiner
UNITED STATES PATENTS

| | | | |
|---|---|---|---|
| 616,033 | 12/98 | Sturcke | 210—383 X |
| 634,113 | 10/99 | Kenney | 210—397 |
| 1,219,290 | 3/17 | Goyne et al. | 210—383 |
| 1,219,796 | 3/17 | Atkins et al. | 210—327 |
| 1,336,444 | 4/20 | Salisbury | 210—68 |
| 1,348,159 | 8/20 | Down | 210—68 |
| 1,510,568 | 10/24 | Sweetland | 210—327 |
| 1,747,149 | 2/30 | Cuno | 210—107 X |
| 1,818,480 | 8/31 | Hoppe | 210—185 X |
| 1,864,237 | 6/32 | Fauth | 210—180 |
| 1,866,970 | 7/32 | Garland et al. | 210—186 |
| 2,058,497 | 10/36 | Pecker | 210—261 |
| 2,245,554 | 6/41 | Court. | |
| 2,429,321 | 10/47 | Brecque | 210—186 |
| 2,523,799 | 9/50 | Woodson | 68—17 X |
| 2,651,418 | 9/53 | Prendergast | 210—332 |
| 2,737,300 | 3/56 | Kracklauer | 210—106 |

REUBEN FRIEDMAN, *Primary Examiner.*

HERMAN BERMAN, HERBERT L. MARTIN,
*Examiners.*